(No Model.)
T. PROSSER.
MEANS FOR HOLDING AND PREVENTING GAS FROM ESCAPING.
No. 326,242. Patented Sept. 15, 1885.
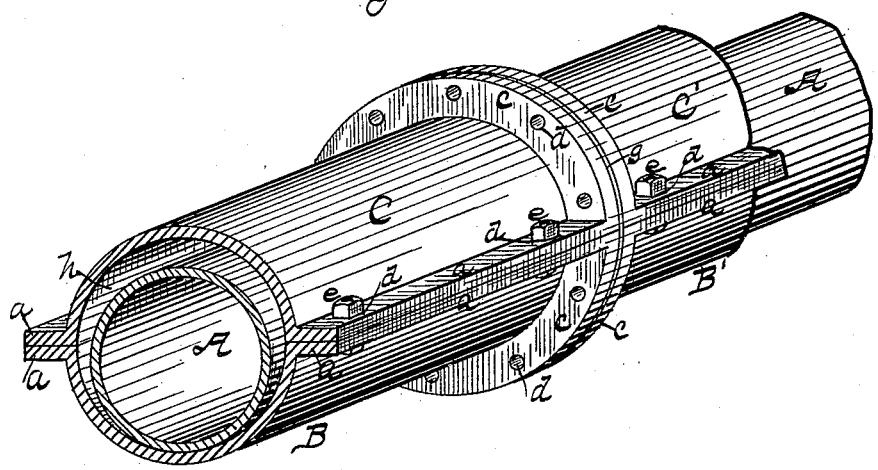
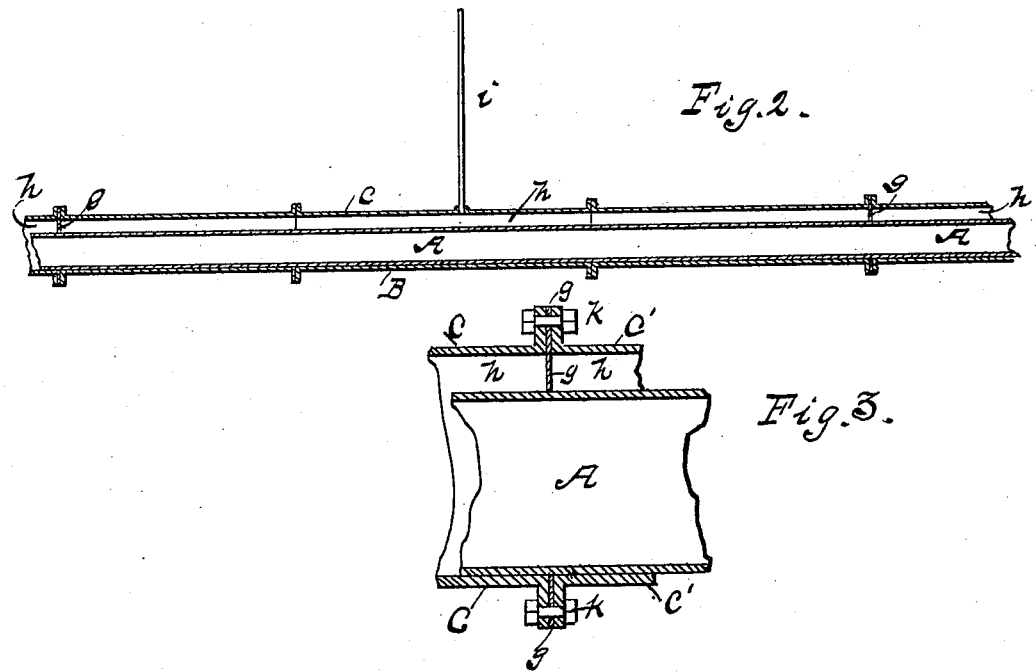
Witnesses:
Inventor:
Thomas Prosser
Per: C D Levis
att'y.

UNITED STATES PATENT OFFICE.

THOMAS PROSSER, OF FRANKLIN SQUARE, OHIO.

MEANS FOR HOLDING AND PREVENTING GAS FROM ESCAPING.

SPECIFICATION forming part of Letters Patent No. 326,242, dated September 15, 1885.

Application filed May 4, 1885. (No model.)

*To all whom it may concern:*

Be it known that I, THOMAS PROSSER, of Franklin Square, Columbiana county, and State of Ohio, have invented certain new and useful Improvements in Means for Holding and Preventing Natural Gas, &c., from Escaping; and I do hereby declare the following to be a full, clear, and exact description of the invention, such as will enable others skilled in the art to which it pertains to make and use it, reference being had to the accompanying drawings, which form part of this specification.

My invention relates to an improvement in means for preventing natural gas, &c., from escaping; and to that end it consists, in addition to the high-pressure main, of a surrounding pipe or cover constructed in sections and securely bolted together, the intervening space being separated into compartments, with an escape-pipe leading therefrom.

In the drawings, Figure 1 is a perspective view of a part of the double pipe, showing the manner of securing the several parts. Fig. 2 is a section through the two pipes, and separated into compartments, with an escape-pipe leading therefrom. Fig. 3 is an enlarged sectional view of the joint of the outside pipe or cover, with a gum gasket placed between the flanges.

To put my invention into practice with a high-pressure main, A—such as are now in general use—I first construct a semicircular section, B, of any desired length, provided with flanges $a$ on the top, and at each end $c$ with holes $d$ for bolts $k$, and place it under the high-pressure conduit A. On the top of this I place another section, C, similar in construction to that before described, and secure them together by bolts $k$.

Another section, C' B', of the same construction, is put together in like manner and bolted to the first by bolts $k$, placed parallel to the line of pipe.

At regular intervals a gum gasket, $g$, is placed between the vertical flanges $c$, which fits neatly about the high-pressure conduit A and forms compartments $h$, from which is conducted a pipe, $i$, of small diameter, and carried above the surface of the ground.

The gas escaping from the high-pressure main A will collect in the different compartments $h$, and is carried above the surface of the ground through the vertical pipe $i$, communicating therewith, and consumed.

I am aware that it is not new to inclose a gas-main in a protecting outside pipe, with provision for dividing it into compartments with escape-pipes; therefore I do not broadly claim such construction, the construction herein described being simply an improvement in that class of inventions.

Having thus described my invention, what I claim as new, and desire to secure by Letters Patent, is—

In combination with a high-pressure conduit, A, an outside pipe or cover constructed in sections C B, provided with outwardly-projecting flanges $a$ and $c$, whereby they form a continuous interior passage when the sections are put together, disk-like gaskets $g$, secured at intervals between the flanges $c$, forming compartments, from which pipes of small diameter lead to the surface, and bolts uniting said sections and gaskets, as shown and described.

THOMAS PROSSER.

Witnesses:
H. T. MORRIS,
M. E. HARRISON.